United States Patent
Stübner et al.

(10) Patent No.: US 7,621,360 B2
(45) Date of Patent: Nov. 24, 2009

(54) DRIVE UNIT FOR A FLOOR TROLLEY

(75) Inventors: Frank Stübner, Ernstroda (DE); Dirk Bald, Gotha (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 333 days.

(21) Appl. No.: 11/369,485

(22) Filed: Mar. 7, 2006

(65) Prior Publication Data

US 2006/0231307 A1  Oct. 19, 2006

(30) Foreign Application Priority Data

Apr. 15, 2005  (DE) ........................ 10 2005 017 723

(51) Int. Cl.
*B60K 1/00* (2006.01)
(52) U.S. Cl. .................. 180/65.6; 180/65.1; 180/65.51
(58) Field of Classification Search ................ 180/65.1, 180/65.6
See application file for complete search history.

(56) References Cited

U.S. PATENT DOCUMENTS

| | | | | |
|---|---|---|---|---|
| 2,327,583 A | * | 8/1943 | Framhein | 180/19.2 |
| 2,564,002 A | * | 8/1951 | Gibson | 180/253 |
| 2,950,773 A | * | 8/1960 | Ulinski | 180/21 |
| 3,166,139 A | * | 1/1965 | Ulinski | 180/13 |
| 4,461,367 A | * | 7/1984 | Eichinger et al. | 180/252 |
| 5,558,174 A | * | 9/1996 | Avitan et al. | 180/60 |
| 6,349,781 B1 | * | 2/2002 | Kruse | 180/7.2 |
| 6,854,555 B2 | | 2/2005 | Raue | |
| 2003/0006084 A1 | * | 1/2003 | Raue | 180/337 |
| 2003/0155163 A1 | * | 8/2003 | Sugata et al. | 180/199 |
| 2004/0007406 A1 | * | 1/2004 | Laurent et al. | 180/65.6 |

FOREIGN PATENT DOCUMENTS

DE  101 30 100 A1  1/2003
EP  1 285 803 A1  2/2003

* cited by examiner

*Primary Examiner*—S. Joseph Morano
*Assistant Examiner*—Katy Meyer
(74) *Attorney, Agent, or Firm*—Davis & Bujold, P.L.L.C.

(57) ABSTRACT

A drive unit for a floor trolley, with at least one steered wheel (1), which is attached to a vehicle chassis (3) so that it can swivel about an essentially vertical swivel axis (2), a drive motor (4) with a drive shaft (5) being arranged coaxially with the swivel axis (2). The motor is in driving connection with the at least one wheel (1) via a gear system (10). The drive motor (4) and the gear system (10) are mounted in a common housing (16), consisting essentially of two separate housing portions, namely, a lower and an upper housing (portion 16a, 16b), that can be joined together by a fastening mechanism (18), and is mounted to rotate on the chassis (3) via at least one roller bearing (19). A drive unit is provided that at least one of the two housing portions (16a, 16b) is associated with a drawbar connection (20) formed integrally therewith by way of the housing (16) being swiveled relative to the chassis (3) about the swivel axis (2).

16 Claims, 4 Drawing Sheets

DRIVE UNIT FOR A FLOOR TROLLEY

This application claims priority from German Application Serial No. 10 2005 017 723.9 filed Apr. 15, 2005.

FIELD OF THE INVENTION

The invention concerns a drive unit for a floor trolley.

BACKGROUND OF THE INVENTION

Drive units for floor trolleys, such as drawbar-steered transport and lifting trolleys, have long been known. They comprise at least one driven and steered wheel attached to a vehicle chassis and able to swivel about an essentially vertical swivel axis. Coaxially with the swivel axis is arranged a drive motor, preferably a three-phase motor. The drive shaft of the motor is in driving connection via a gear system with at least one wheel. To produce a drive unit as compact as possible, the drive motor and gear system are usually accommodated in a common housing consisting essentially of two separate housing portions that can be joined firmly together by mechanical fastening means. This housing is mounted and able to rotate on the chassis of the floor trolley by virtue of a roller bearing (DE 101 30 100 A1, EP 1 285 803 A1).

Furthermore, DE 101 30 100 A1 shows that a steering connection is arranged on the drive motor, by means of which the housing together with the gear system and the wheel connected thereto and the drive motor can be swivelled by virtue of the roller bearing. No further details of the steering connection are disclosed, but conventionally a drawbar is attached to the motor housing.

In contrast, according to EP 1 285 803 A1, the drive shaft projecting upward out of the motor housing can be used to connect a steering fork. In this case too, no further explanatory details are given about how the connection of the steering fork is to be realized in practice.

Against that background, the purpose of the invention is to develop further a drive unit of the type described, in such a manner that compared with those of the prior art it is even more compact, can be assembled with less effort and has a smaller number of individual components as a result of which a saving of production costs can be achieved.

SUMMARY OF THE INVENTION

Accordingly, the invention starts from a drive unit for a floor trolley with at least one steered wheel, which is attached to a vehicle chassis so as to swivel about an essentially vertical swivel axis. A drive motor with a drive shaft is arranged coaxially with the swivel axis, the motor for its portion being in driving connection with the at least one wheel via a gear system. The drive motor and the gear system is accommodated in a common housing consisting essentially of two separate housing portions, namely, a lower and an upper housing portion that can be joined firmly together by way of mechanical fastening means and which is mounted to rotate on the chassis by virtue of at least one roller bearing.

According to the invention, it is also provided that at least one of the two housing portions is associated with a drawbar connection formed integrally with it by way of which the housing can be swivelled about the swivel axis relative to the chassis.

It is appropriate for at least one portion of the housing, together with the connection for the drawbar, to be made integrally as a casting.

In accordance with a preferred first variation of the invention, the lower portion of the housing forms, in one piece as it were, a gearbox housing and a motor housing in which the gear system, the drive motor, the A-bracket of the latter and the roller bearing for connection to the chassis are accommodated, while the upper portion of the housing is formed by the B-bracket of the motor and is fixed directly onto the lower portion of the housing. Here, the A-bracket is a bearing bracket adjacent to the gear system and the B-bracket is the bearing bracket remote from the gears.

Preferably, the drawbar connection is arranged on the lower housing portion radially close to the roller bearing and/or the drive motor.

According to the second preferred design of the invention, the lower portion of the housing forms a gearbox housing and accommodates the gear system, the A-bracket of the drive motor and the roller bearing for connection to the chassis, while the upper housing portion forms, in one piece as it were, both a motor housing and the B-bracket of the drive motor and is fixed directly onto the lower housing portion.

In this case, the drawbar connection can be arranged on the upper housing portion and preferably radially close to the drive motor.

Finally, according to a third preferred embodiment of the invention, the lower housing portion forms a gearbox and accommodates the gear system, the A-bracket of the drive motor, the A-side of the latter and the roller bearing for connection to the chassis, while the upper housing portion is fixed on the lower housing portion a distance away therefrom and is formed by an extended B-bracket of the drive motor which accommodates the B-side of the drive motor.

Here, it has been found appropriate to arrange the drawbar connection on the upper housing portion, projecting a short way beyond it.

As the invention also provides, a brake that acts on the drive shaft of the drive motor can be supported on the upper housing portion or on the B-bracket.

In the lower housing portion, it is also possible to arrange a rotation speed sensor suitable for detecting the current speed of a gear wheel of the gear system. This enables speed measurement in the area of the motor to be omitted, which saves both space and costs.

Finally, it is proposed to choose the dimensions at least of that section of the lower housing portion which assumes the transmission function in such manner that is enclosed by the enveloping circle (HKR) which describes the at least one wheel with its outer diameter.

BRIEF DESCRIPTION OF THE DRAWINGS

The invention will now be described, by way of example, with reference to the accompanying drawings in which.

DETAILED DESCRIPTION OF THE INVENTION

Figure 1:
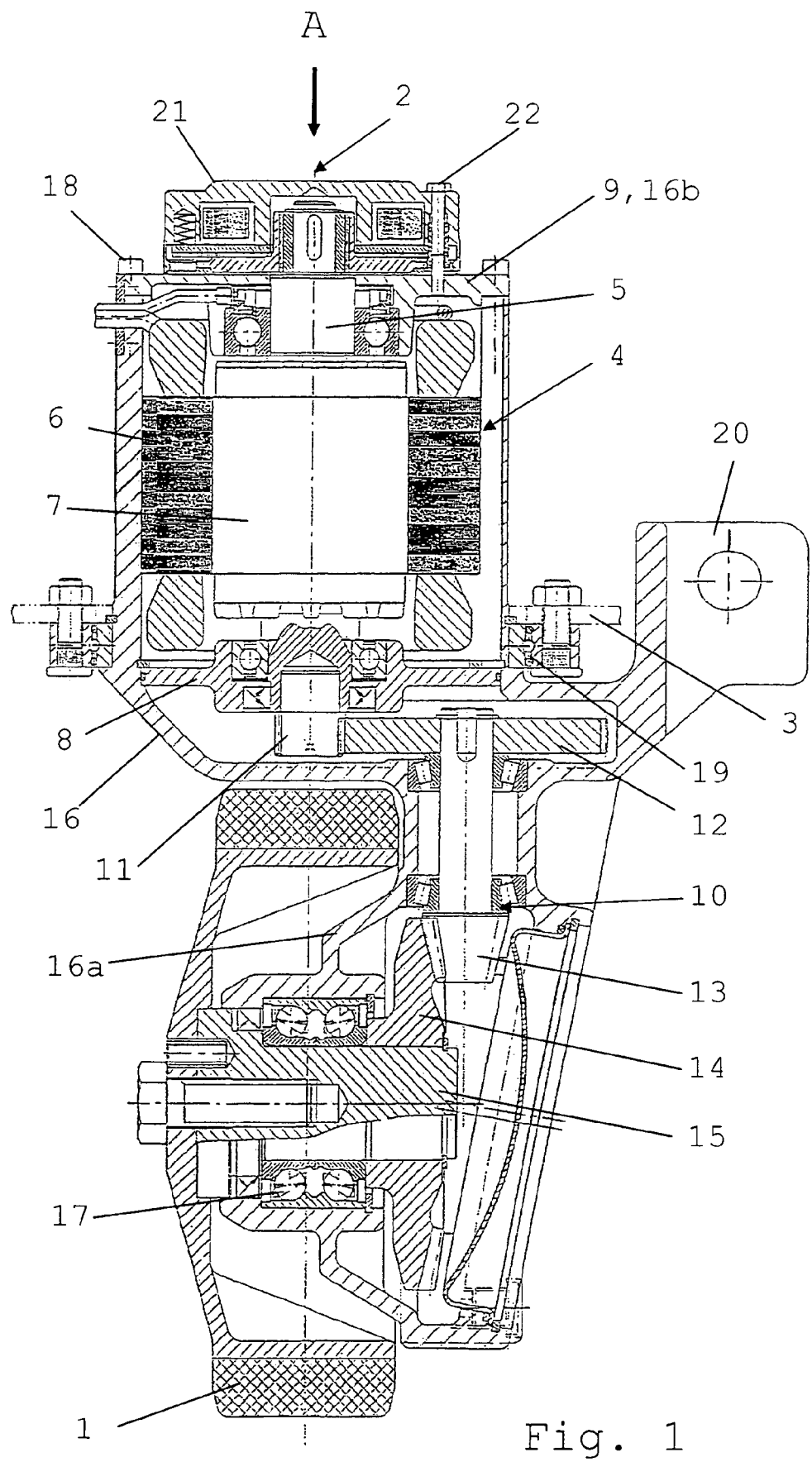
FIG. 1 is a sectional view of a first preferred variant of a drive unit formed according to the invention.
Figure 2:
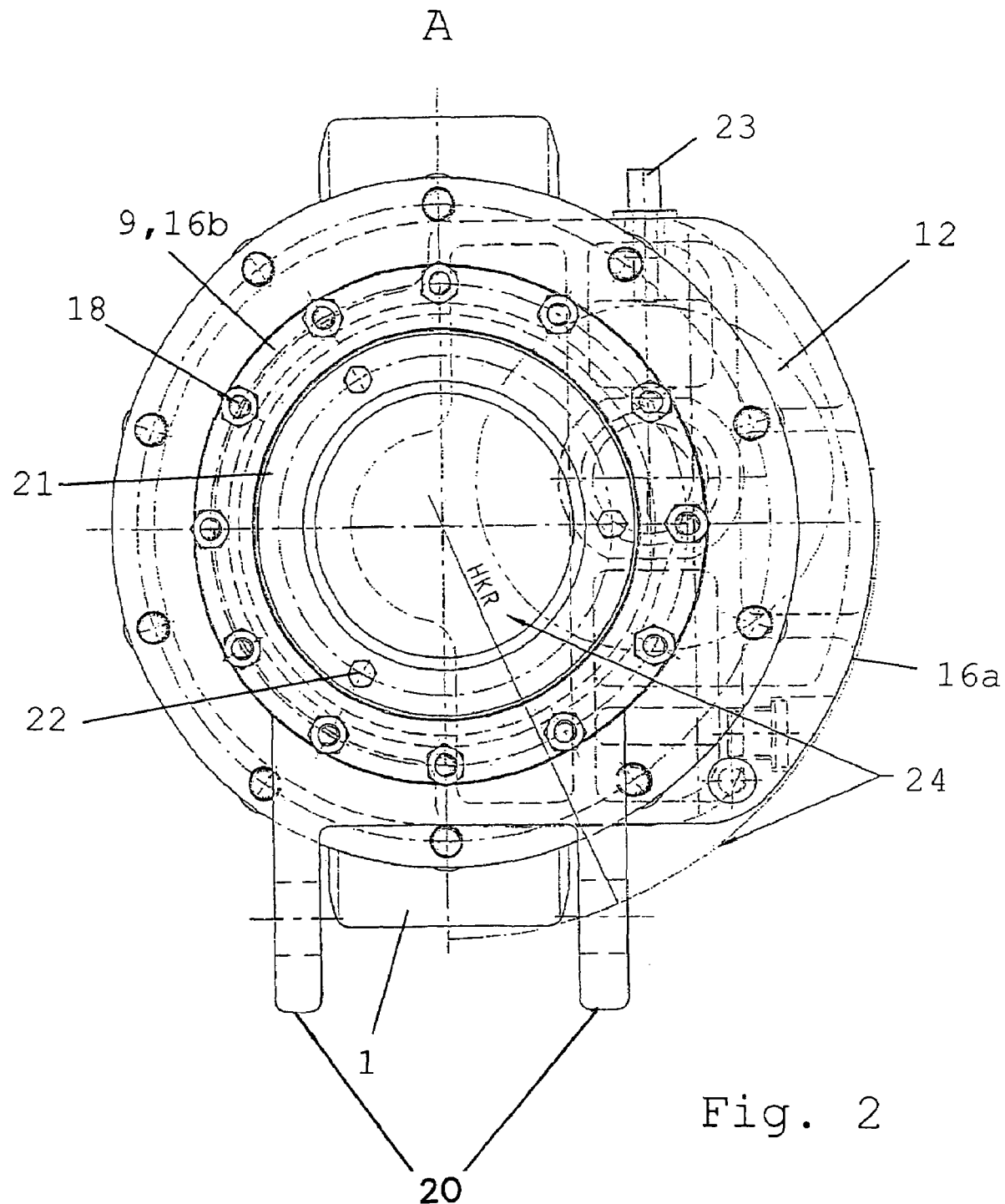
FIG. 2 is a view along "A" in FIG. 1.

FIGS. 1 and 2 show a first example embodiment of a drive unit for a floor trolley, for example, a drawbar-steered transport and lifting trolley, with a steered wheel 1 attached to swivel about an essentially vertical swivel axis 2 on a vehicle chassis 3 of the floor trolley whose location is here only indicated.

Coaxially with the swivel axis 2 is arranged a drive motor 4, preferably a three-phase motor, whose drive shaft 5 is connected fast to a rotor 7 arranged inside a stator 6 thereof and is mounted to rotate in a so-termed A-bracket 8 on the side near the gears and a B-bracket 9 on the opposite side.

The drive shaft 5 is actively connected to the wheel 1 via a gear system 10 such that the torque produced by the drive motor 4 is transferred to the wheel 1 via a first and a second gear step.

The first gear step is formed by a spur gear, with a spur gear wheel 11 connected fast to the drive shaft 5 which engages with a second spur gear wheel 12. The second spur gear wheel 12, for its part, drives the second gear step in the form of a miter gearset, in the present case a conical pinion 13 thereof, which meshes with a conical gear 14. In turn, the conical gear 14 is in rotationally fixed connection via a shaft 15 with the wheel 1, the shaft 15 being supported on a housing 16 of the drive unit by roller bearings 17.

The housing 16 consists essentially of two separate housing portions that can be connected firmly together by mechanical fastening means 18, namely a lower housing portion 16a and an upper housing portion 16b, and is in this case mounted to rotate on the chassis 3 via a roller bearing 19.

As can also be seen from FIG. 1, the lower portion 16a of the housing forms, in one piece as it were, a gearbox and motor housing and accommodates the gear system 10, the drive motor 4, the A-bracket 8 of the latter and the roller bearing 19 for attachment to the chassis 3.

The upper portion 16b of the housing is formed essentially by the B-bracket 9 of the drive motor 4.

The lower and upper housing portions 16a, 16b are directly adjacent and are connected fast to one another by mechanical fastening means 18, in this case in the form of screw-bolts.

The lower housing portion 16a comprises a drawbar connection 20 which, for its part, is formed integrally on the lower portion 16a of the housing. The lower housing portion 16a, together with its drawbar connection 20, can therefore be made as a casting. Preferably, a metal casting, such as grey cast iron or aluminum, can be used for this. Instead, however, it is also conceivable to use a suitable plastic material known as such or some other suitable material.

As also disclosed in FIG. 1, the drawbar connection 20 is arranged radially close to the roller bearing 19 and radially close to the drive motor 4 and, accordingly, approximately at the level of the connection of the drive unit to the chassis 3.

As for the upper housing portion 16b, this can also be made as a casting. It is also conceivable, however, and is subsumed in the invention, to make it as a shaped sheet component, for example, a deep-drawn component, granted the simplicity of its design.

If the upper housing portion 16b is made as a casting, the drawbar connection 20 can also be arranged on it (not illustrated here).

On the upper portion 16b of the housing, i.e., on the B-bracket 9, is supported a brake 21 known as such, which is also attached to the B-bracket 9 by fastening means 22, in this case screw-bolts, and which acts upon the drive shaft 5 of the drive motor 4 projecting upwards therefrom.

Further, a rotation speed sensor 23, known as such, is arranged in the lower housing portion 16a which, in the present case, detects the current speeds of the spur gear wheel 12 and generates suitable signals which are ultimately made known and/or used for the control of the drive motor 4 (FIG. 2).

As can also be seen from FIG. 2, the dimensions at least of the section of the lower housing portion 16a, which assumes the transmission function, are chosen such that this is enclosed by an enveloping circle 24 or HKR that describes the wheel 1. This minimizes the structural space needed for the accommodation of the gearbox function.

Figure 3:
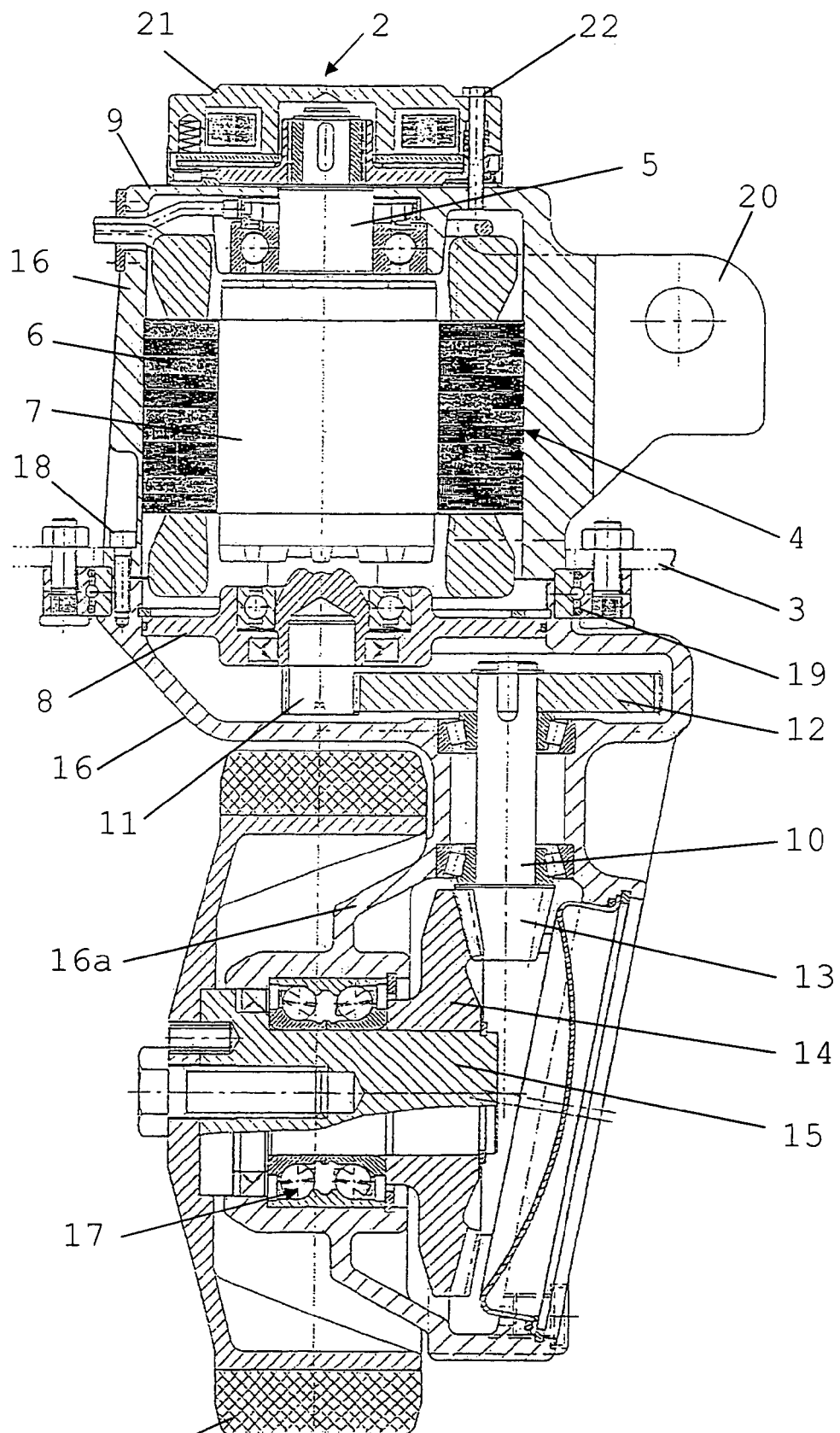
FIG. 3 is a drive unit according to a second preferred embodiment.

The example embodiment, according to FIG. 3, differs from the example embodiment described above in that the lower housing portion 16a forms exclusively a gearbox housing and accommodates the gear system 10, the A-bracket 8 of the drive motor 4 and the roller bearing 19 for connecting the drive unit to the chassis 3.

On the other hand, the upper housing portion 16b forms, in one piece as it were, both a motor housing and the B-bracket 9 of the drive motor 4.

The lower and upper housing portions 16a, 16b are connected fast directly to one another in the immediate area of the roller bearing 19, and a drawbar connection 20 is formed on the upper housing portion 16b close to the drive motor 4.

In this case, it is appropriate to make the upper housing portion 16b together with the drawbar connection 20 as a casting. However, by analogy with the example embodiment, according to FIG. 1, the drawbar connection 20 can also be arranged on the lower housing portion 16a (not illustrated here).

Figure 4:
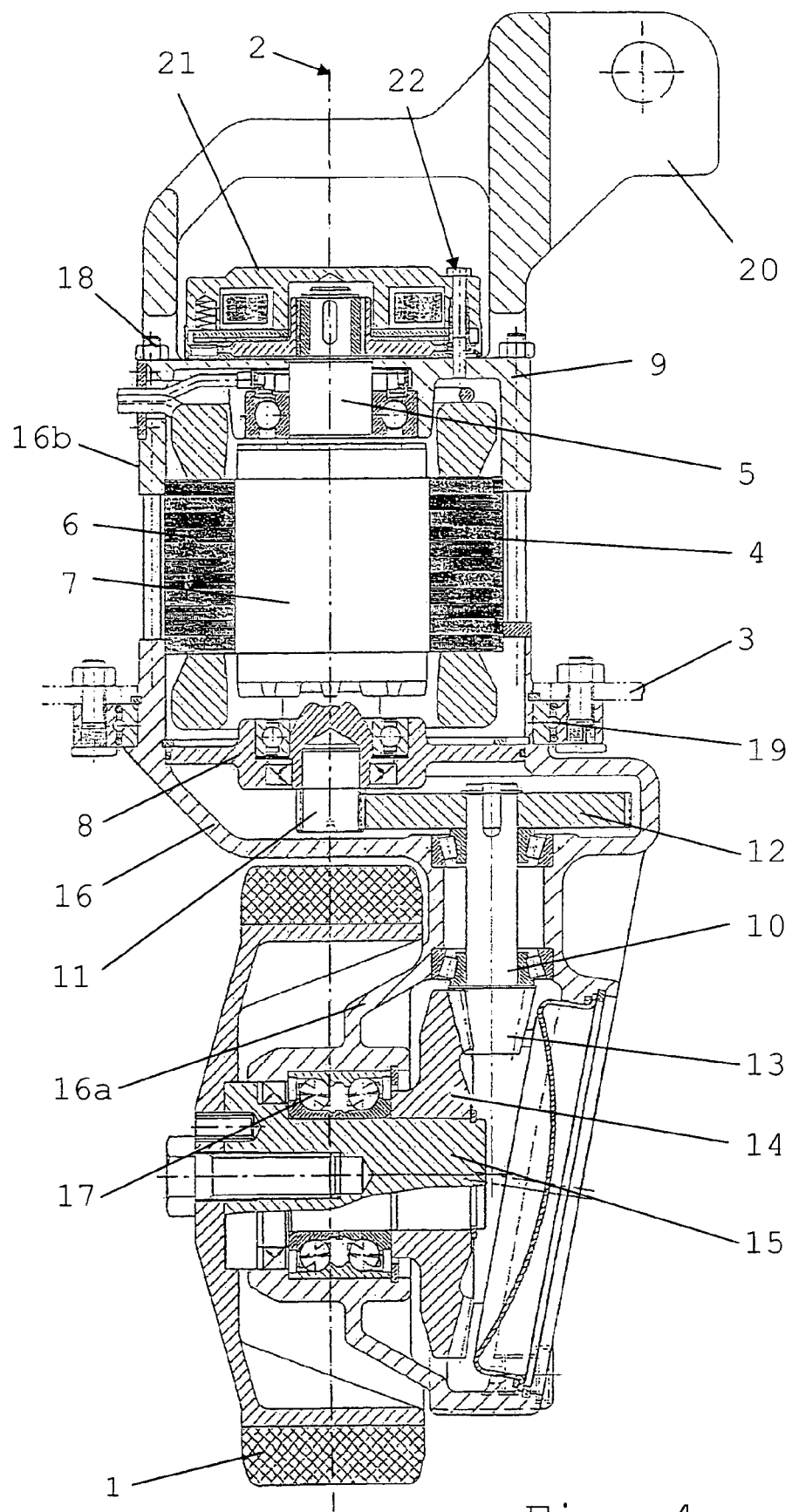
FIG. 4 is a drive unit according to a third preferred design.

Finally, FIG. 4 shows a drive unit whose lower housing portion 16a is arranged a distance away from the upper housing portion 16b and connected fast to the latter by fastening means 18 in the form of long screw-bolts.

By analogy with the example embodiment according to FIG. 3, the lower housing portion 16a then forms the gearbox housing and accommodates the gear system 10, the A-bracket 8 of the drive motor 4 and the roller bearing 19. Further, the A-side of the drive motor, i.e., a limited lower section of the stator 6 thereof, is accommodated in the lower housing portion 16a.

The upper housing portion 16b is formed by an extended B-bracket 9 which extends a limited distance above the brake 21 and accommodates the B-side of the drive motor 4 and a limited upper section of the stator 6.

The drawbar connection 20 can then be arranged on the upper housing portion 16b, and it has been found advantageous for this to project axially above the upper housing portion 16b.

Of course, referring to one of the example embodiments described earlier, in this case too the drawbar connection 20 can be arranged on the lower housing portion 16a (not illustrated here).

REFERENCE NUMERALS

1 wheel
2 swivel axis
3 vehicle chassis
4 drive motor
5 drive shaft
6 stator
7 rotor
8 A-bracket
9 B-bracket
10 gear system
11 spur gear wheel
12 spur gear wheel/gear wheel
13 conical pinion
14 conical gear wheel
15 shaft
16 housing
16a lower housing portion
16b upper housing portion
17 roller bearing 18 fastening means
19 roller bearing
20 drawbar connection
21 brake
22 fastening means
23 rotation speed sensor
24 enveloping circle—HKR

The invention claimed is:

1. A drive unit for a floor trolley, with at least one steered wheel (1) attached to a vehicle chassis (3) such that the at least one steered wheel (1) can swivel about an essentially vertical swivel axis (2), a drive motor (4) with a drive shaft (5) being arranged coaxially with the swivel axis (2), the drive motor (4) being drivingly connected with the at least one wheel (1) via a gear system (10), the drive motor (4) end the gear system (10) being mounted in a common housing (16) which comprises a lower housing portion (16a) and an upper housing portion (16b) which are joined together by mechanical fasteners (18), and which is mounted to rotate on the vehicle chassis (3) via at least one roller bearing (19) located between the drive motor (4) and the gear system (10) such that the gear system (10) is located primarily below the at least one roller bearing (19), the lower housing portion (16a) containing both the drive motor (4) and the gear system (10) and completely enclosing the gear system (10) and forming a hub for the steered wheel (1), and at least one of the lower housing portion (16a) and the upper housing portion (16b) having a drawbar connection (20) formed integrally therewith by which the entire common housing (16), including the steered wheel (1), swivels about the swivel axis (2) relative to the chassis (3) with the drawbar connection (20) being located vertically above the gear system (10), and the drawbar connection (20) having an arm extending radially from the swivel axis (2), at a location closely adjacent the drive motor (4) and the at least one bearing (19), such that the arm of the drawbar connection (20) is offset from the swivel axis (2).

2. The drive unit according to claim 1, wherein at least one of the lower housing portion (16a) and the upper housing portion (16b) is formed together as a casting with the drawbar connection (20).

3. The drive unit according to claim 1, wherein the lower housing portion (16a) forms a one piece a gearbox housing, and a motor housing accommodates the gear system (10), the drive motor (4), an A-bracket (8) of the drive motor (4) and the at least one roller bearing (19) for connection to the chassis (3), while the upper housing portion (16b) is formed by a B-bracket (9) of the drive motor (4) and is fixed directly on the lower housing portion (16a).

4. A drive unit for a floor trolley, with at least one steered wheel (1) attached to a vehicle chassis (3) such that the at least one steered wheel (1) can swivel about an essentially vertical swivel axis (2), a drive motor (4) with a drive shaft (5) being arranged coaxially with the swivel axis (2), the drive motor (4) being drivingly connected with the at least one wheel (1) via a gear system (10), the drive motor (4) and the gear system (10) being mounted in a common housing (16) which comprises a lower housing portion (16a) and an upper housing portion (16b) which are joined together by mechanical fasteners (18), and which is mounted to rotate on the vehicle chassis (3) via at least one roller bearing (19), the lower housing portion (16a) containing both the drive motor(4) and the gear system (10), and at least one of the lower housing portion (16a) and the upper housing portion (16b) having a drawbar connection (20) formed integrally therewith by which the housing (16) can swiveled about the swivel axis (2) relative to the chassis (3), and the drawbar connection (20) having an arm extending radially from the swivel axis (2), at a location closely adjacent the drive motor (4) and the at least one bearing (19), such that the arm of the drawbar connection (20) is offset from the swivel axis (2);
the lower housing portion (16a) forms a one niece a gearbox housing, and a motor housing accommodates the gear system (10), the drive motor (4), an A-bracket (8) of the drive motor (4) and the at least one roller bearing (19) for connection to the chassis (3), while the upper housing portion (16b) is formed by a B-bracket (9) of the drive motor (4) and is fixed directly on the lower housing portion (16a); and
the drawbar connection (20) is integral with the lower housing portion (16a) radially adjacent the at least one roller bearing (19) and the drive motor (4).

5. The drive unit according to claim 1, wherein the lower housing portion (16a) forms a gearbox housing which accommodates the gear system (10), an A-bracket (8) of the drive motor (4) and the at least one roller bearing (19) for connection to the chassis (3), while the upper housing portion (16b) forms both a motor housing and a B-bracket (9) of the drive motor (4) and is fixed directly to the lower housing portion (16a).

6. The drive unit according to claim 5, wherein the drawbar connection (20) is integral with the upper housing portion (16b) radially adjacent the drive motor (4).

7. The drive unit according to claim 1, wherein the lower housing portion (16a) forms a gearbox housing which accommodates the gear system (10), an A-bracket (8) of the drive motor (4), an A-side of the drive motor (4) and the at least roller bearing (19) for connection to the chassis (3), while the upper housing portion (16b) is fixed to the lower housing portion (16a) a distance away therefrom and is formed by an extended B-bracket (9) of the drive motor (4), which accommodates a B-side of the drive motor (4).

8. The drive unit according to claim 7, wherein the drawbar connection (20)is integral with the upper housing portion (16b) and projects axially beyond the upper housing portion (16b).

9. The drive unit according to claim 1, wherein a brake (21), that acts upon the drive shaft (5) of the drive motor (4), is supported by at least one of the upper housing portion (16b) and a B-bracket (9).

10. The drive unit according to claim 1, wherein a rotational speed sensor (23) is arranged in the lower housing portion (16a), for detecting a current rotational speed of a gear wheel (12) of the gear system (10).

11. The drive unit according to claim 1, wherein dimensions, at least for a section of the lower housing portion (16a) that assumes a transmission function, are selected such that the section of the lower housing portion (16a) is enclosed by an enveloping circle (24 or HKR) which describes the at least one wheel (1).

12. The drive unit according to claim 1, wherein the drawbar connection (20) is Integral with the lower housing portion (16a) and is radially offset from the swivel axis (2), and the drawbar connection (20) extends from the lower housing portion (16a) at a location, along the swivel axis (2), which is vertically below the drive motor (4) and the attachment of the drive unit with the vehicle chassis (3).

13. The drive unit according to claim 1, wherein the drawbar connection (20) is located vertically below the attachment of the drive unit to the vehicle chassis (3).

14. A drive unit for a floor trolley comprising:
a drive wheel (1) being pivotably attached to a chassis (3) of the floor trolley such that the drive wheel (1) pivots about a substantially vertical swivel axis (2) for steering a floor trolley;

a drive motor (4) having a drive shaft (5) and a rotational axis of the drive motor (4) and a rotational axis of the drive shaft (5) are both coaxially aligned with the swivel axis (2), and the drive shaft (5) being drivingly coupled to the drive wheel (1) via a gear system (10) for providing drive thereto;

a unitary housing (16) containing both the drive motor (4) and the gear system (10), the unitary housing (16) being supported by the chassis (3) via at least one roller bearing (19) such that the housing (16), the drive motor (4), the drive shaft (5) and the gear system (10) all pivot about the swivel axis (2), and the roller bearing (19) being located between the drive motor (4) and the gear system (10) so that the gear system (10) is located primarily below the at least one roller bearing (19);

a drawbar connection (20) being located vertically above the gear system (10) and integral with the housing (16) and having an arm extending radially from the swivel axis (2), at a location closely adjacent the drive motor (4) and the at least one bearing (19), such that the arm of the drawbar connection (20) is offset from the swivel axis (2).

15. The drive unit according to claim 14, wherein a bracket (9) is coupled to a top of the unitary housing (16) for enclosing the drive motor (4), an end of the drive shaft (5) extends into the bracket (9) and communicates with a brake (21), which is fixed to a top of the bracket (9), for facilitating braking of the drive wheel (1).

16. The drive unit according to claim 14, wherein the drawbar connection (20) is located vertically below the attachment of the drive unit to the vehicle chassis (3).

* * * * *